(12) United States Patent
Guo et al.

(10) Patent No.: US 11,971,159 B2
(45) Date of Patent: Apr. 30, 2024

(54) SENSING DEVICE AND LIGHTING DEVICE (71) Applicant: SAVANT TECHNOLOGIES LLC, East Cleveland, OH (US)

(72) Inventors: Guangting Guo, Shanghai (CN); Kun Xiao, Shanghai (CN); Hai Huang, Shanghai (CN); Pan Yao, Shanghai (CN); Wei Rong, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 365 days.

(21) Appl. No.: 17/365,587

(22) Filed: Jul. 1, 2021

(65) Prior Publication Data
US 2022/0057076 A1 Feb. 24, 2022

(30) Foreign Application Priority Data

Aug. 20, 2020 (CN) .......................... 202021751347.7

(51) Int. Cl.
| | |
|---|---|
| *F21V 23/04* | (2006.01) |
| *F21V 5/04* | (2006.01) |
| *F21V 25/12* | (2006.01) |
| *G01J 5/02* | (2022.01) |
| *G01J 5/04* | (2006.01) |
| *G01J 5/0806* | (2022.01) |

(52) U.S. Cl.
CPC .......... *F21V 23/0464* (2013.01); *F21V 5/045* (2013.01); *F21V 25/12* (2013.01); *G01J 5/025* (2013.01); *G01J 5/042* (2013.01); *G01J 5/045* (2013.01); *G01J 5/0806* (2013.01)

(58) Field of Classification Search
CPC ...... F21V 23/0464; F21V 5/045; F21V 25/12; G01J 5/025; G01J 5/042; G01J 5/045; G01J 5/0806
See application file for complete search history.

(56) References Cited

U.S. PATENT DOCUMENTS

| | | | | |
|---|---|---|---|---|
| 5,677,529 | A * | 10/1997 | Hofmann | G01J 1/0414 250/221 |
| 2005/0127297 | A1* | 6/2005 | Starta | G01N 21/3504 250/341.5 |
| 2006/0133101 | A1* | 6/2006 | Furtwangler | F21V 29/76 362/494 |

(Continued)

FOREIGN PATENT DOCUMENTS

| | | | | |
|---|---|---|---|---|
| CN | 203102517 U | | 7/2013 | |
| CN | 106641773 A | | 5/2017 | |
| CN | 212929936 U | * | 4/2021 | .............. F21V 23/04 |

*Primary Examiner* — David P Porta
*Assistant Examiner* — Gisselle M Gutierrez
(74) *Attorney, Agent, or Firm* — WOOD IP LLC (57) ABSTRACT

The application relates to a sensing device and a lighting device. The sensing device comprises a sensor provided with a glass window to transmit light and is configured to sense light incident upon the sensor; a circuit board, wherein one side of the circuit board is provided with the sensor; a Fresnel lens arranged above the sensor and configured to transmit light to the sensor; and a housing made from a flame-resistant material, wherein the housing comprises an accommodation space configured to accommodate the sensor and the circuit board, and the housing is provided with a center hole to expose the glass window. By adopting the technical solution, the sensor has flame-resistant performance.

9 Claims, 6 Drawing Sheets (56) References Cited

U.S. PATENT DOCUMENTS

| | | | |
|---|---|---|---|
| 2010/0044567 A1* | 2/2010 | Brandt | G01J 5/0804 |
| | | | 250/334 |
| 2010/0079973 A1* | 4/2010 | Brandt | H01H 9/04 |
| | | | 361/837 |
| 2012/0229283 A1* | 9/2012 | McKenna | G08B 29/183 |
| | | | 340/584 |
| 2019/0059142 A1* | 2/2019 | Chen | F21V 15/01 |
| 2019/0101274 A1* | 4/2019 | Chen | F21V 23/0471 |
| 2019/0253670 A1* | 8/2019 | Chien | F21S 4/28 |
| 2020/0217713 A1* | 7/2020 | Wang | G08B 13/19 |

* cited by examiner

SENSING DEVICE AND LIGHTING DEVICE

TECHNICAL FIELD

The application relates to the field of sensors, in particular to a sensing device and a lighting device.

BACKGROUND

An existing Fresnel lens is matched with a passive infrared sensor (PIR) to implement human body induction. The Fresnel lens cannot pass a flammability test. Because it is needed to use an independently isolated driving circuit adopting safety voltage to provide operating voltage and current to the sensor by using the non-fireproof lens, the cost is very high.

SUMMARY

The application provides a sensing device and a lighting device to at least solve the problem that it is hard to provide flame-resistant performance to the sensing device in the prior art.

According to one aspect of the embodiment of the application, a sensing device is provided, including: a sensor provided with a glass window to transmit light and configured to sense light incident upon the sensor; a circuit board, one side of the circuit board is provided with the sensor; a Fresnel lens arranged above the sensor and configured to transmit light to the sensor; and a housing made from a flame-resistant material, the housing includes an accommodation space configured to accommodate the sensor and the circuit board, and the housing is provided with a center hole to expose the glass window.

In such a mode, flame-resistant performance is provided to the sensing device. The driving circuit is designed by adopting a non-isolated scheme, so that the cost is lowered.

According to the exemplary embodiment of the application, the housing includes a top housing and a bottom housing matched with each other, the top housing is arranged on the side, where the sensor is arranged, of the circuit board, the bottom housing is arranged on the opposite side of the side of the circuit board, and the center hole is arranged in the top housing.

In such a mode, the housing can protect the circuit board and the sensor without affecting sensation of light by the sensor.

According to the exemplary embodiment of the application, the sensing device further includes an sealing body configured to separate the accommodation space from the outside of the housing, the sealing body includes a first sealing sheet arranged between the top housing and the sensor and is provided with an opening corresponding to the center hole of the top housing and the glass window to expose the glass window; and a second sealing sheet arranged between the bottom housing and the top housing.

In such a mode, the circuit board and the sensor are sealed in the accommodation space of the housing, so that a condition that liquids such as rainwater enter into the accommodation space to damage the circuit board and the sensor can be avoided.

According to the exemplary embodiment of the application, the top housing is provided with a first clipping structure; the bottom housing is provided with a second clipping structure; and the top housing and the bottom housing are fixed to each other by matching the first clipping structure with the second clipping structure.

In such a mode, the top housing and the bottom housing can be matched with and fixed to each other easily.

According to the exemplary embodiment of the application, the bottom housing is provided with a groove; the end, facing the bottom housing, of the top housing, is provided with a flange; and the opening end of the Fresnel lens is provided with a clipping structure, the clipping structure is matched with the groove, and the flange of the top housing is clamped between the opening end of the Fresnel lens and the bottom housing.

In such a mode, the Fresnel lens and the top housing and the bottom housing can be matched with and fixed to each other easily.

According to the exemplary embodiment of the application, the circuit board is provided with a driving circuit, configured to provide a driving current to the sensor.

In such as mode, electric power can be provided to the sensor by adopting a non-isolated circuit.

According to the exemplary embodiment of the application, the sensor is a passive infrared sensor.

In such a mode, the sensing device can sense existence of a human body.

According to the exemplary embodiment of the application, the housing is mounted on a diffusion hood of a lighting device and insulates heat generated by the sensor and a light source for lighting of the lighting device.

In such a mode, the sensing device is not affected by the heat generated by the light source for lighting.

According to another aspect of the embodiment of the application, A lighting device is provided, the lighting device comprising a lamp holder, a lamp body, a light source and a diffusion hood, and a driver for providing driving power is mounted in the lamp body, and the lighting device further comprises a sensing device, wherein the sensing device comprises: a sensor, wherein the sensor is provided with a glass window to transmit light and is configured to sense light incident upon the sensor; a circuit board, wherein one side of the circuit board is provided with the sensor; a Fresnel lens, wherein the Fresnel lens is arranged above the sensor and is configured to transmit light to the sensor; and a housing, wherein the housing is made from a flame-resistant material, the housing comprising an accommodation space which is configured to accommodate the sensor and the circuit board, and the housing is provided with a center hole to expose the glass window.

In this mode, the sensing device provided on the lighting device is provided with flame-resistant performance.

According to the exemplary embodiment of the application, the sensing device is supplied with operating power by a non-isolated driving circuit in the driver.

In this mode, the cost of the driving circuit is reduced.

In the embodiment of the application, the technical solution of providing the flame-resistant housing between the circuit board and the Fresnel lens is provided to at least solve the technical problem that it is hard to provide flame-resistant performance to the sensing device, so that the technical effect of lowering the cost as it is allowed to provide driving electric power to the sensor by means of the non-isolated circuit is achieved.

BRIEF DESCRIPTION OF THE DRAWINGS

The accompanying drawings described herein are used to provide further understanding of the application, and constitute a part of the application, and the exemplary embodiments of the application and the description thereof are used to explain the application, but do not constitute improper limitations to the application. In the drawings.

MARKS OF THE DRAWINGS

1: sensing device;
10: sensor;
101: glass window;
20: circuit board;
30: Fresnel lens;
301: clipping structure;
40: housing;
401: accommodation space;
403: center hole;
410: top housing;
411: first clipping structure;
413: flange;
420: bottom housing;
421: second clipping structure;
423: groove;
50: sealing body;
501: non-isolated constant current driving circuit;
503: LED;
505: optical coupling path;
507: isolated constant voltage driving circuit;
509: human body inductive sensor;
511: lens;
510: first sealing sheet;
520: second sealing sheet;
601: non-isolated constant current driving circuit;
603: LED;
605: non-isolated constant voltage driving circuit;
607: human body inductive sensor;
609: lens;
611: flame-resistant material;
7: lighting device;
710: lamp holder;
720: lamp body;
721: driver;
722: driver housing;
723: strip line terminal;
724: heat sink;
730: light source;
740: diffusion hood.

DETAILED DESCRIPTION OF THE EMBODIMENTS

In order to make those skilled in the art better understand the solutions of the application, the technical solutions in the embodiments of the application will be clearly and completely described below with reference to the drawings in the embodiments of the application. It is apparent that the described embodiments are only part of the embodiments of the application, but not all of the embodiments. All other embodiments obtained by those of ordinary skill in the art based on the embodiments of the application without creative efforts should fall within the scope of protection of the application.

It is to be noted that the specification and claims of the application and the terms "first", "second" and the like in the drawings are used to distinguish similar objects, and do not need to describe a specific sequence or a precedence order. It will be appreciated that data used in such a way may be exchanged under appropriate conditions, in order that the embodiments of the application described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or modules or units to clearly list those steps or modules or units, and other steps or modules or units which are not clearly listed or are inherent to these processes, methods, products or devices may be included instead.

Figure 1:
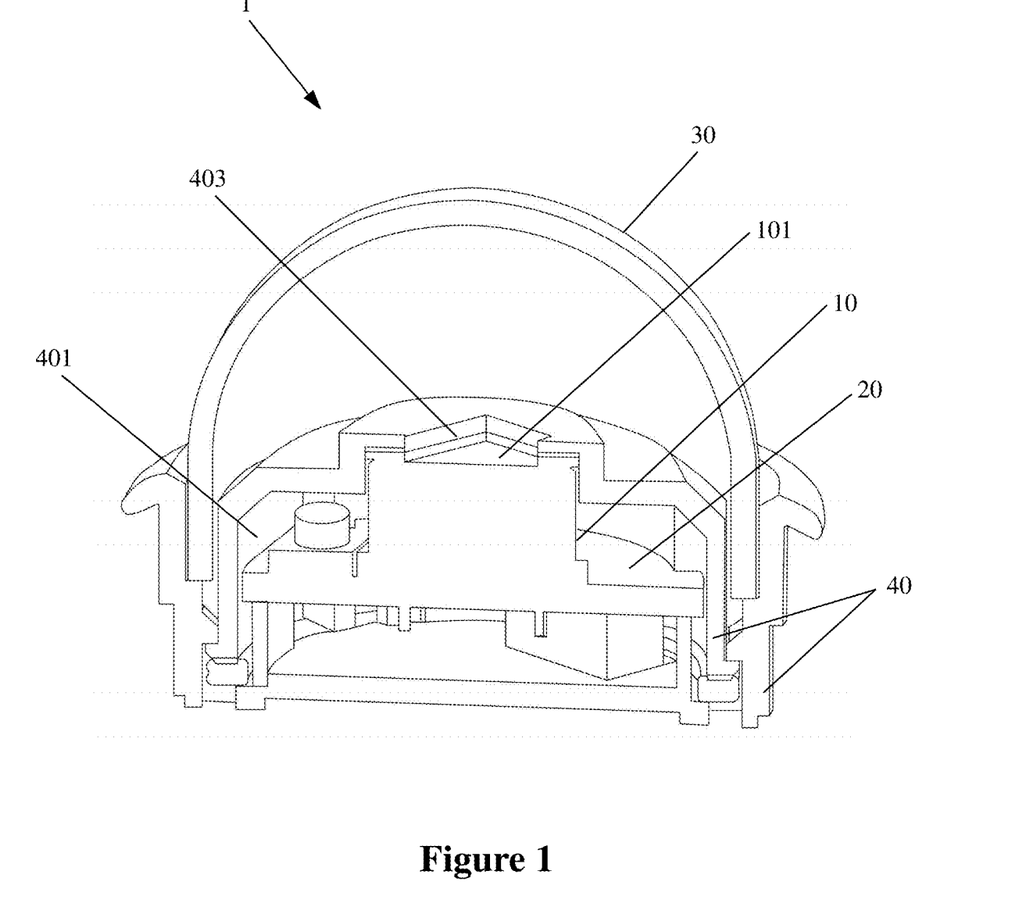
FIG. 1 is a schematic diagram of a profile of the sensing device according to an embodiment of the application.

According to the embodiments of the application, a sensing device is provided. FIG. 1 is a schematic diagram of a profile of the sensing device according to an embodiment of the application. As shown in FIG. 1, the sensing device 1 includes a sensor 10, a circuit board 20, a Fresnel lens 30 and a housing 40.

The sensor 10 is provided with a glass window 101 to transmit light and is configured to sense light incident upon the sensor 10. One side of the circuit board 20 is provided with the sensor 10. The Fresnel lens 30 is arranged above the sensor 10 and is configured to transmit light to the sensor 10. Particularly, the opening end of the Fresnel lens 30 faces the sensor 10 to converge light to the sensor 10. Light is transmitted to the glass window 101 to be sensed by the sensor 10. The housing 40 is made from a high-temperature-resistant material. In particular, The housing 40 is made from a flame-resistant material. The housing 40 includes an accommodation space 401 configured to accommodate the sensor 10 and the circuit board 20, and the housing 40 is provided with a center hole 403 to expose the glass window 101, so that light transmitting the Fresnel lens 30 is captured by the sensor 10 rather than being blocked by the housing 40. For example, the housing 40 is made from a V0 PC material.

In such a mode, flame-resistant performance is provided to the sensing device. The driving circuit is designed by adopting a non-isolated scheme, so that the cost is lowered.

Figure 2:
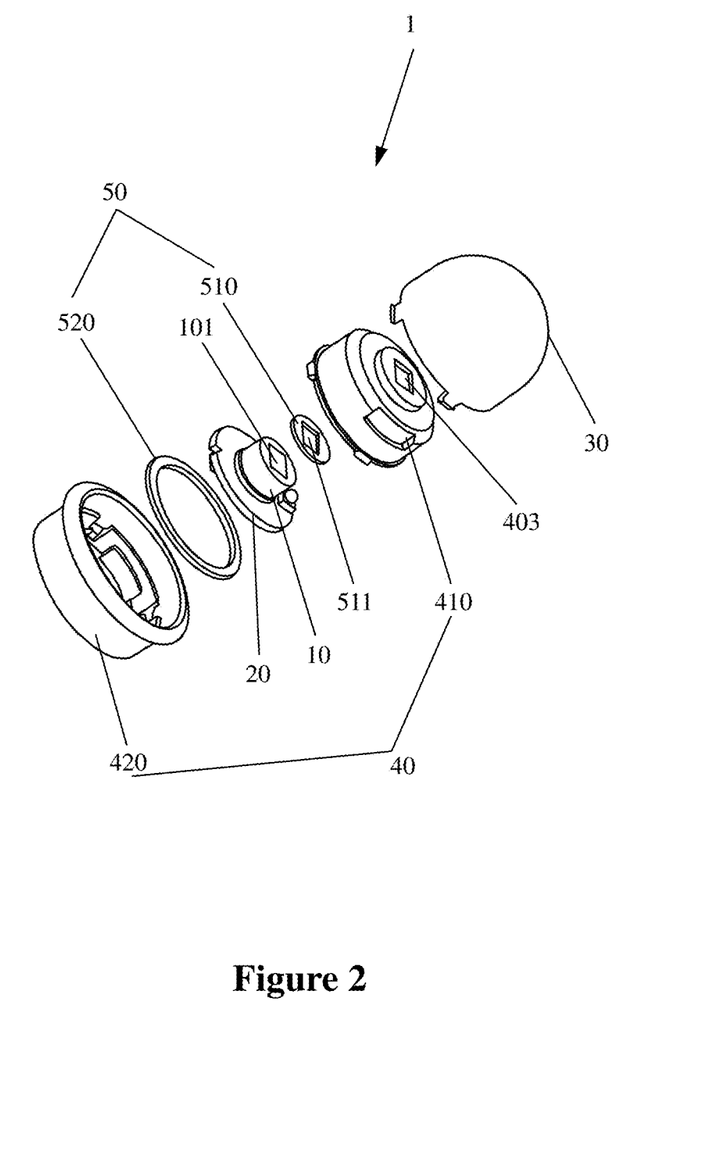
FIG. 2 is an exploded schematic diagram of the sensing device according to an exemplary embodiment of the application.

According to an exemplary embodiment of the application, a sensing device is provided. FIG. 2 is an exploded schematic diagram of the sensing device according to an exemplary embodiment of the application. As shown in FIG. 2, according to the exemplary embodiment of the application, the housing 40 of the sensing device 1 includes a top housing 410 and a bottom housing 420 matched with each other. The top housing 410 is arranged on the side, where the sensor 10 is arranged, of the circuit board 20, the bottom housing 420 is arranged on the opposite side of the side of the circuit board 20, and the center hole 403 is arranged in the top housing 410. Light passing through the Fresnel lens 30 is sensed by the sensor 10 through the center hole 403.

In such a mode, the housing can protect the circuit board and the sensor without affecting sensation of light by the sensor.

As shown in FIG. 2, according to the exemplary embodiment of the application, the sensing device 1 includes an sealing body 50 configured to separate the accommodation space 401 from the outside of the housing 40. The sealing body 50 includes a first sealing sheet 510 and a second sealing sheet 520. The first sealing sheet 510 is arranged between the top housing 410 and the sensor 10 and is provided with an opening 511 corresponding to the center hole 403 of the top housing 410 and the glass window 101 to expose the glass window 101. Light passing through the Fresnel lens 30 is sensed by the sensor 10 through the center hole 403 and the opening 511. The second sealing sheet 520 is arranged between the bottom housing 420 and the top housing 410. For example, the first sealing sheet 510 and the second sealing sheet 520 can be rubber rings for sealing. Thus, the end of the sensor 10 is hermetically connected to the top housing 410 by means of the first sealing sheet 510 and the bottom housing 420 is hermetically connected to the top housing 410 by means of the second sealing sheet 520, thereby forming a sealed accommodation space.

In such a mode, the circuit board and the sensor are sealed in the accommodation space of the housing, so that a condition that liquids such as rainwater enter into the accommodation space to damage the circuit board and the sensor can be avoided. Thus, the sensing device according to the exemplary embodiment of the application can work in an outdoor open environment.

Figure 3:
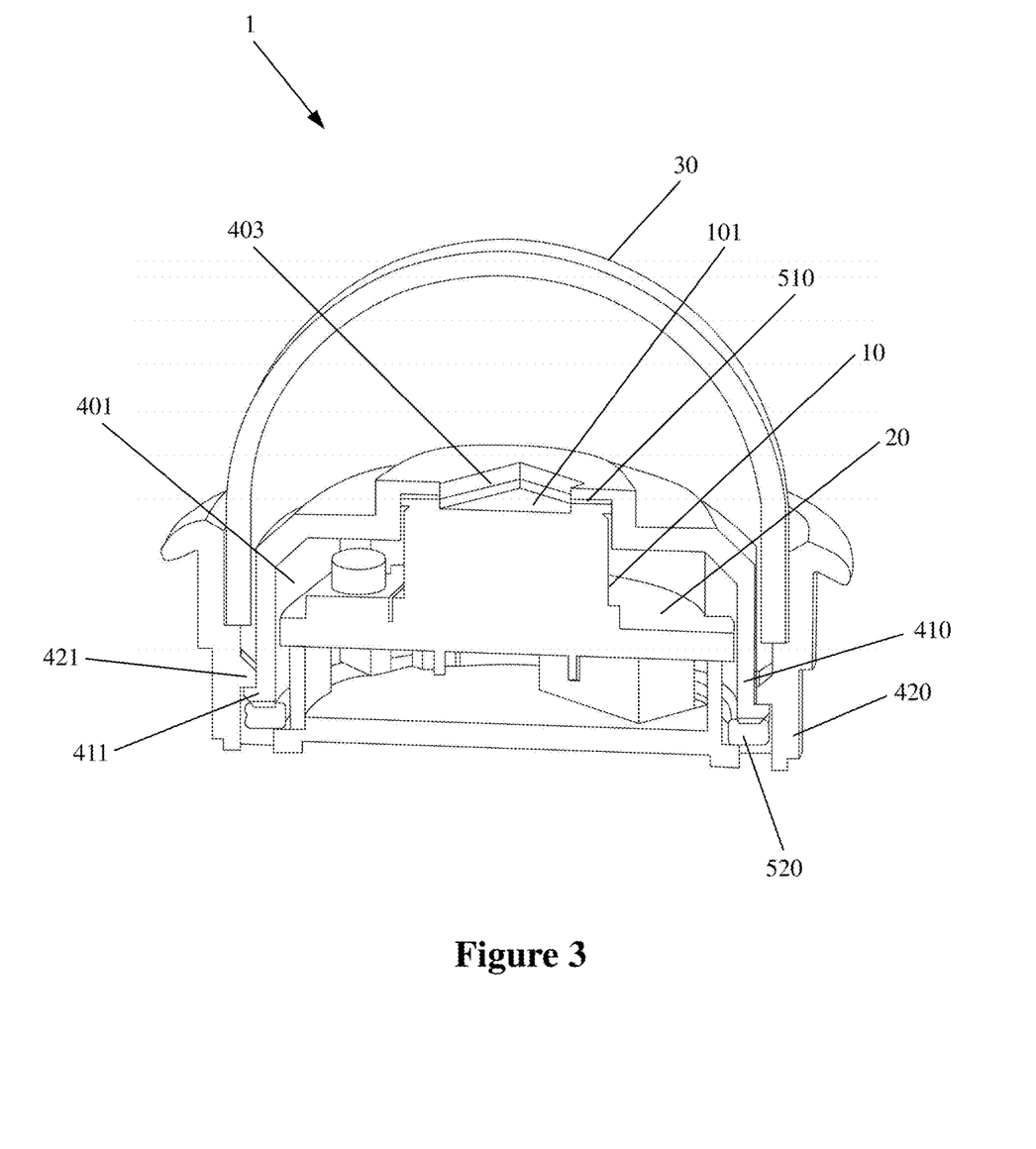
FIG. 3 is a schematic diagram of a profile of the sensing device according to an exemplary embodiment of the application.

According to an exemplary embodiment of the application, a sensing device is provided. FIG. 3 is a schematic diagram of a profile of the sensing device according to an exemplary embodiment of the application. As shown in FIG. 3, according to the exemplary embodiment of the application, the top housing 410 of the sensing device 1 is provided with a first clipping structure 411. The bottom housing 420 of the sensing device 1 is provided with a second clipping structure 421. The top housing 410 and the bottom housing 420 are fixed to each other by matching the first clipping structure 411 with the second clipping structure 421. For example, the first clipping structure 411 and the second clipping structure 421 may be of a plurality of separated structures or may be integrally formed around the inner circumference of the housing. The Fresnel lens 30 is arranged above the top housing 410.

In such a mode, the top housing and the bottom housing can be matched with and fixed to each other easily.

Figure 4:
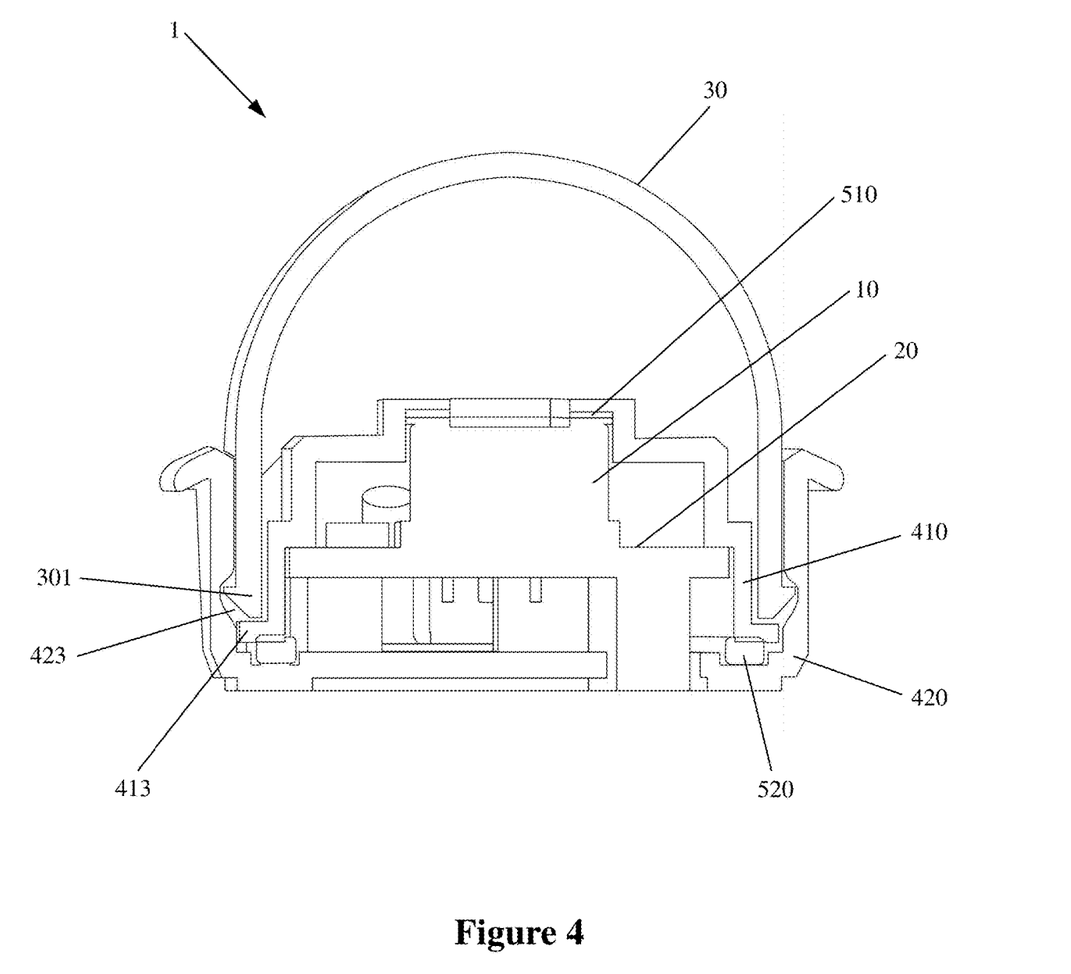
FIG. 4 is a schematic diagram of a profile of the sensing device according to an exemplary embodiment of the application.

According to an exemplary embodiment of the application, a sensing device is provided. FIG. 4 is a schematic diagram of a profile of the sensing device according to an exemplary embodiment of the application. As shown in FIG. 4, according to an exemplary embodiment of the application, the bottom housing 420 of the sensing device 1 is provided with a groove 423. The end, facing the bottom housing 420, of the top housing 410 of the sensing device 1 is provided with a flange 413. The opening end of the Fresnel lens 30 is provided with a clipping structure 301, the clipping structure 301 is matched with the groove 423, and the flange 413 of the top housing 410 is clamped between the opening end of the Fresnel lens 30 and the bottom housing 420. For example, the groove 423 may be of a plurality of separated groove structures formed around the inner circumference of the bottom housing 420 or may be of a continuous groove structure formed around the inner circumference of the bottom housing 420. The flange 413 may be of a plurality of separated flange structures or may be of a continuous flange structure formed around the outer circumference of the top housing 410. For example, the top housing 410 is matched with the bottom housing 420, and meanwhile, the clipping structure 301 of the Fresnel lens 30 extends into the groove 423 of the bottom housing 420 to connect the top housing 410 to the bottom housing 420 hermetically by means of the second sealing sheet 520.

In such a mode, the Fresnel lens and the top housing and the bottom housing can be matched with and fixed to each other easily.

According to an exemplary embodiment of the application, the circuit board 20 is provided with a driving circuit, configured to provide a driving current to the sensor 10. In such a mode, electric power can be provided to the sensor by adopting a non-isolated circuit. According to an exemplary embodiment of the application, the sensor 10 is a passive infrared sensor. In such a mode, the sensing device can sense existence of a human body.

Figure 5:
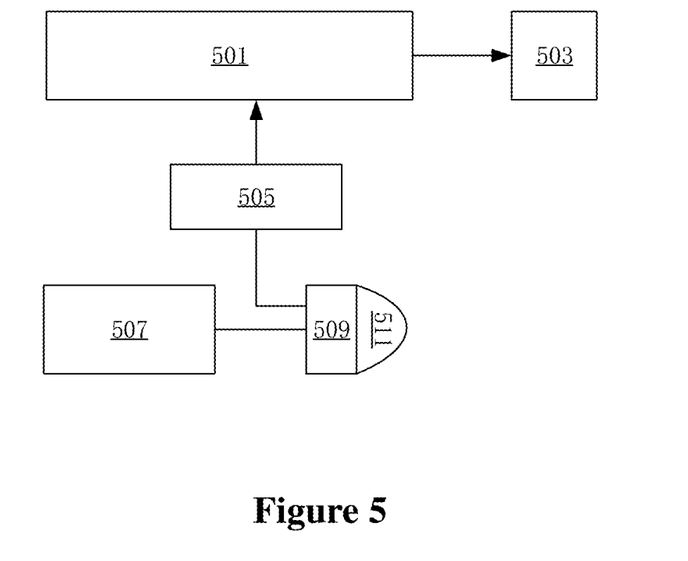
FIG. 5 is a schematic diagram of a human body sensing circuit.

FIG. 5 is a schematic diagram of a human body sensing circuit. As shown in FIG. 5, the human body sensing circuit includes a non-isolated constant current driving circuit 501, an LED 503, an optical coupling path 505, an isolated constant voltage driving circuit 507, a human body inductive sensor 509 and a lens 511. In order to provide the driving electric power to the human body inductive sensor 509 safely and provide a signal to the non-isolated constant current driving circuit 501 through the optical coupling path 505 to light up the LED 503 when the human body inductive sensor 509 senses a human body, it is needed to arrange an isolated constant voltage driver and a low drop-out linear regulator (LDO) in the isolated constant voltage driving circuit 507. In addition, it is further needed to ground the two driving circuits separately. The cost is high in such a mode of adopting isolated driving electric power.

Figure 6:
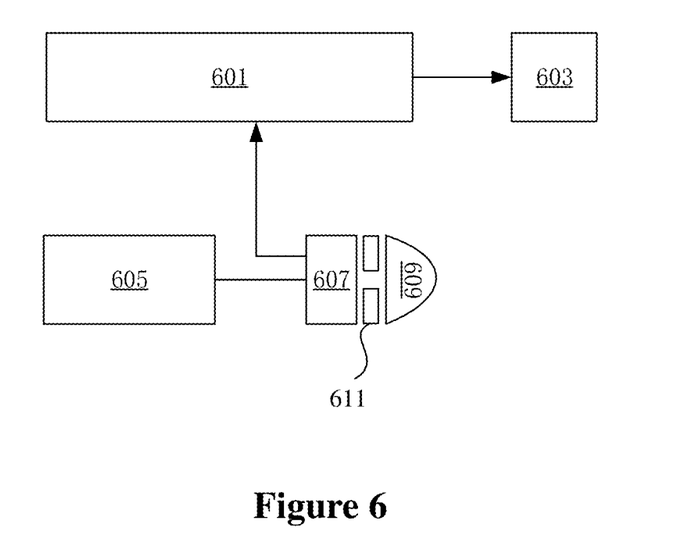
FIG. 6 is a schematic diagram of a human body sensing circuit according to an embodiment of the application.

FIG. 6 is a schematic diagram of a human body sensing circuit according to an embodiment of the application. As shown in FIG. 6, the human body sensing circuit according to the embodiment of the application includes a non-isolated constant current driving circuit 601, an LED 603, a non-isolated constant voltage driving circuit 605, a human body inductive sensor 607, a lens 609 and a flame-resistant material 611. The human body inductive sensor 607, the lens 609 and the flame-resistant material 611 may adopt the sensing device including the sensor, the Fresnel lens and the housing according to the embodiment of the application. Flame-resistant performance can be provided by adopting the technical solution, so that it is not needed to arrange an isolated driving circuit. As shown in FIG. 6, the non-isolated constant voltage driving circuit 605 is adopted to provide driving electric power to the human body inductive sensor 607. When sensing a human body, the human body inductive sensor 607 provides a signal to the non-isolated constant current driving circuit 601, so as to light up the LED 603. The whole human body sensing circuit is commonly grounded. By adopting the human body sensing circuit in the FIG. 6, the cost of the circuit is lowered while flame-resistant performance is provided.

Figure 7:
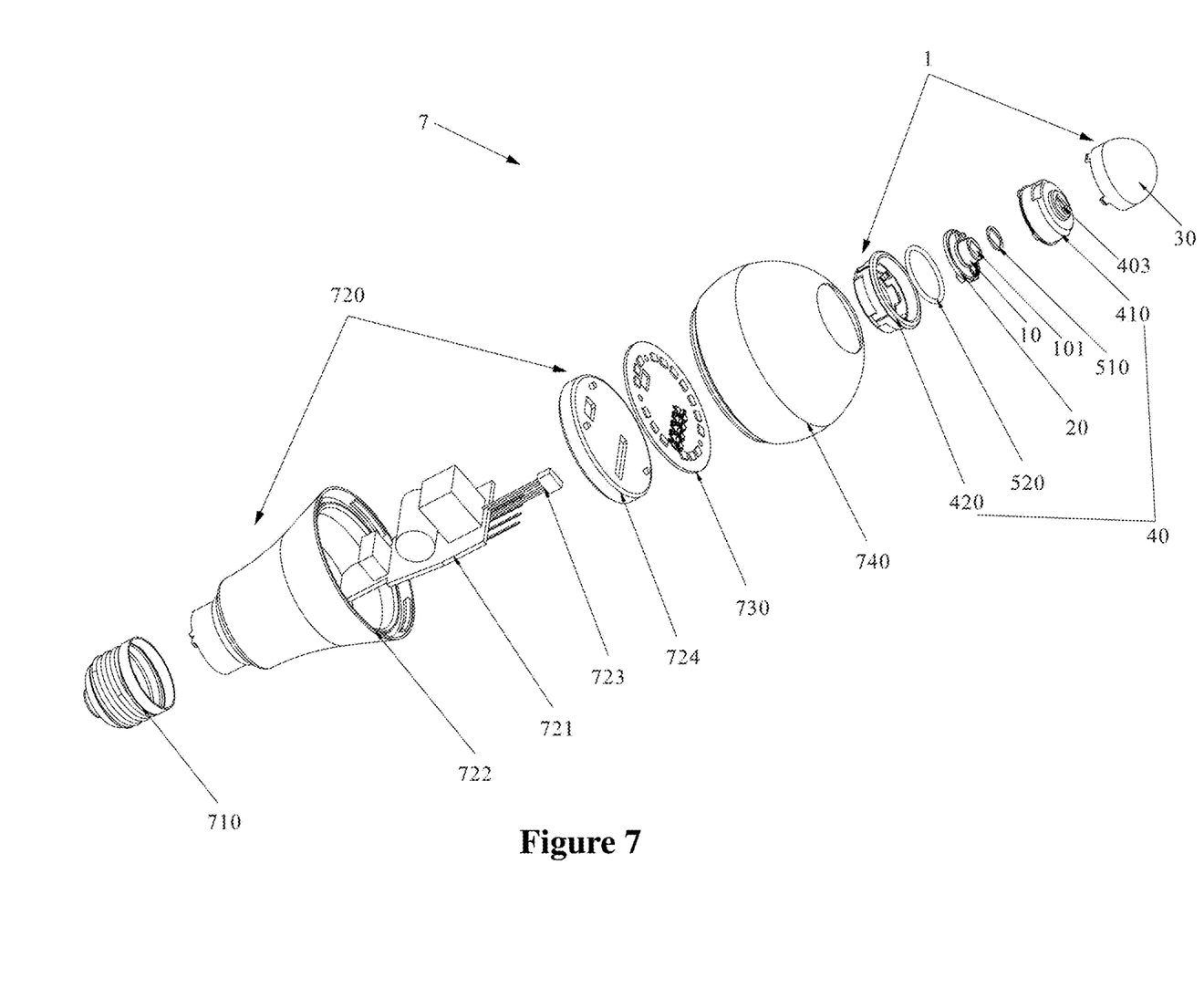
FIG. 7 is an exploded schematic diagram of the lighting device according to another aspect of the application.

FIG. 7 is an exploded schematic diagram of the lighting device according to another aspect of the application. As shown in FIG. 7, the housing 40 is mounted on a diffusion hood of a lighting device and insulates heat generated by the sensor and a light source for lighting of the lighting device. The sensing device is not affected by the heat generated by the light source for lighting, as the sensing device 1 is disposed on the lighting device 7 as described above.

In addition, as shown in FIG. 7, the lighting device 7 according to another embodiment of the present application comprises a lamp holder 710, a lamp body 720, a light source 730 and a diffusion hood 740. Wherein a driver 721 for providing driving power is mounted in the lamp body 720, and the lighting device 7 further comprises a sensing device 1, wherein the sensing device 1 comprises a sensor 10, a circuit board 20, a Fresnel lens 30, and a housing 40. The sensor 10 is provided with a glass window 101 to transmit light and is configured to sense light incident upon the sensor 10. One side of the circuit board 20 is provided with the sensor 10. The Fresnel lens 30 is arranged above the sensor 10 and is configured to transmit light to the sensor 10. The housing 40 is made from a flame-resistant material, the housing 40 comprising an accommodation space which is configured to accommodate the sensor 10 and the circuit board 20, and the housing 40 is provided with a center hole 403 to expose the glass window 101. In this mode, the sensing device provided on the lighting device is provided with flame-resistant performance. Specifically, the sensing device 1 shown in FIG. 7 may apply the sensing device described above in the present application, and the description is omitted here.

According to the exemplary embodiment of the application, the sensing device 1 is supplied with operating power by a non-isolated driving circuit in the driver 721. According to an exemplary embodiment of the present application, no isolated driving circuit needs to be separately provided, thereby reducing the cost of the driving circuit.

In addition, as shown in FIG. 7, the lighting device 7 according to another embodiment of the present application further includes a driver housing 722, a strip line terminal 723, and a heat sink 724. Specifically, the driver housing 722 is used for protection of the illumination device 7, the strip line terminal 723 is used for connecting the driver 721 and the sensing device 1 to supply the operating power to the sensing device 1, and the heat sink 724 is used for isolating the light source 730 from the driver 721 side and for heat dissipation.

In the above embodiments of the application, descriptions of each embodiment are emphasized respectively, and parts which are not elaborated in detail in a certain embodiment may refer to relevant descriptions of other embodiments.

In several embodiments provided by the application, it is to be understood that the disclosed technical content may be implemented in other manners. The apparatus embodiments described above are merely illustrative. For example, the division of the unit or module is only a logical function division. In actual implementation, there may be another division manner, for example, multiple units or modules may be combined or integrated into another system, or some features may be ignored or not executed. In addition, the coupling or direct coupling or communication connection shown or discussed may be an indirect coupling or communication connection through some interfaces, modules or units, and may be electrical or otherwise.

The units or modules described as separate components may or may not be physically separated, and the members displayed as units or modules may or may not be physical units or modules, that is, may be located in one place, or may be distributed to multiple network units or modules. Some or all of the units or modules may be selected according to actual needs to achieve the purpose of the solution of the present embodiment.

In addition, each functional unit or module in each embodiment of the application may be integrated into a processing unit or module, each unit or module may also physically exist independently, and two or more than two units or modules may also be integrated into a unit or module. The integrated unit or module may be implemented in a hardware form and may also be implemented in the form of a software functional unit or module.

The integrated unit may be stored in a computer-readable storage medium if being implemented in the form of a software functional unit and sold or used as a standalone product. Based on such an understanding, the technical solution of the application, which is essential or contributes to the conventional art, may be embodied in the form of a software product. The computer software product is stored in a storage medium, including a number of instructions for causing a terminal device (which may be a personal computer, a server, or a network device, etc.) to perform all or part of the steps of the methods described in various embodiments of the application. The foregoing storage medium includes: a U disk, a Read-Only Memory (ROM), a Random Access Memory (RAM), a mobile hard disk, a magnetic disk, or an optical disk, and the like, which may store a program code.

The above is preferred implementation of the application. It is to be noted that a number of modifications and refinements may be made by those of ordinary skill in the art without departing from the principles of the application, and such modifications and refinements are also considered to be within the scope of protection of the application.

What is claimed is:

1. A sensing device, comprising:
   a sensor (i) being provided with a glass window to transmit light and (ii) configured to sense light incident upon the sensor;
   a circuit board having the sensor provided on a side of the circuit board;
   a Fresnel lens (i) being arranged above the sensor (ii) and configured to transmit light to the sensor; and
   a housing (i) being made from a flame-resistant material (ii) comprising an accommodation space being configured to accommodate the sensor and the circuit board; (iii) further comprising a top housing and a bottom housing matched with each other, the top housing being arranged on a side of the circuit board where the sensor is provided, and the bottom housing being arranged on a side opposite of where the sensor is provided on the circuit board; and (iv) being provided with a center hole that is arranged in the top housing to expose the glass window;
   wherein at least a portion of the housing is arranged between the Fresnel lens and the circuit board.

2. The sensing device as claimed in claim 1, further comprising a sealing body configured to separate the accommodation space from the outside of the housing, wherein the sealing body comprises:
   a first sealing sheet, arranged between the top housing and the sensor, and is provided with an opening corresponding to the center hole of the top housing and the glass window to expose the glass window; and
   a second sealing sheet, arranged between the bottom housing and the top housing.

3. The sensing device as claimed in claim 1, wherein:
   the top housing is provided with a first clipping structure;
   the bottom housing is provided with a second clipping structure; and
   the top housing and the bottom housing are fixed to each other by matching the first clipping structure with the second clipping structure.

4. The sensing device as claimed in claim 1, wherein:
   the bottom housing is provided with a groove;

an end, facing the bottom housing, of the top housing is provided with a flange; and an opening end of the Fresnel lens is provided with a clipping structure; and wherein the clipping structure is matched with the groove, and the flange of the top housing is clamped between the opening end of the Fresnel lens and the bottom housing.

5. The sensing device as claimed in claim 1, wherein the circuit board is provided with:

a driving circuit, configured to provide a driving current to the sensor.

6. The sensing device as claimed in claim 1, wherein:

the sensor is a passive infrared sensor.

7. The sensing device as claimed in claim 1, wherein the housing is mounted on a diffusion hood of a lighting device and insulates heat generated by the sensor and a light source for lighting of the lighting device.

8. A lighting device comprising a lamp holder, a lamp body, a light source, a diffusion hood, a driver mounted in the lamp body, and a sensing device, the sensing device comprising:

a sensor (i) being provided with a glass window to transmit light and (ii) configured to sense light incident upon the sensor;

a circuit board having the sensor provided on a side of the circuit board;

a Fresnel lens (i) being arranged above the sensor (ii) and configured to transmit light to the sensor; and a housing (i) being made from a flame-resistant material (ii) comprising an accommodation space being configured to accommodate the sensor and the circuit board; (iii) further comprising a top housing and a bottom housing matched with each other, the top housing being arranged on a side of the circuit board where the sensor is provided, and the bottom housing being arranged on a side opposite of where the sensor is provided on the circuit board; and (iv) being provided with a center hole that is arranged in the top housing to expose the glass window;

wherein at least a portion of the housing is arranged between the Fresnel lens and the circuit board.

9. The lighting device according to claim 8, wherein the sensing device is supplied with operating power by a non-isolated driving circuit in the driver.

* * * * *